United States Patent [19]

Corigliano et al.

[11] Patent Number: 4,814,150
[45] Date of Patent: Mar. 21, 1989

[54] PROCESS FOR THE HIGH-YIELD RECOVERY OF VANADIUM FROM PETROLEUM COMBUSTION RESIDUES

[75] Inventors: Francesco Corigliano; Sebastiana Di Pasquale; Patrizia Primerano, all of Messina; Cesare Zipelli, Ragusa, all of Italy

[73] Assignee: Ente Minerario Siciliano, Palermo, Italy

[21] Appl. No.: 72,482

[22] Filed: Jul. 13, 1987

[30] Foreign Application Priority Data

Jul. 17, 1986 [IT] Italy .................................. 21162 A/86

[51] Int. Cl.4 ................................................ C01G 31/00
[52] U.S. Cl. ........................................ 423/67; 423/68; 423/592; 423/593
[58] Field of Search ................. 423/62, 67, 68, 592, 423/593

[56] References Cited

U.S. PATENT DOCUMENTS

| | | | |
|---|---|---|---|
| 1,999,807 | 4/1935 | Gibbs | 423/68 |
| 3,416,882 | 12/1968 | Whigham | 423/68 |
| 3,712,942 | 1/1973 | Svejda | 423/68 |
| 3,873,669 | 3/1975 | Guillaud | 423/68 |
| 4,061,712 | 12/1977 | Morgan et al. | 423/68 |
| 4,640,823 | 2/1987 | Goddard | 423/68 |

FOREIGN PATENT DOCUMENTS

| | | | |
|---|---|---|---|
| 8090 | of 1969 | Japan | 423/68 |
| 32404 | 8/1974 | Japan | 423/68 |
| 2412214 | 9/1975 | Netherlands | 423/67 |
| 97711 | 11/1977 | U.S.S.R. | 423/67 |
| 867484 | 5/1961 | United Kingdom | 423/67 |

Primary Examiner—John Doll
Assistant Examiner—Wayne A. Langel
Attorney, Agent, or Firm—Guido Modiano; Albert Josif

[57] ABSTRACT

A process for the high-yield recovery of vanadium from petroleum combustion residues, wherein these residues are: (a) subjected to attach with sodium hydroxide in the presence of an oxidizer, or (b) impregnated with sodium hydroxide, dried at 100°–250° C. and leached with water, to selectively extract vanadium with high yields. The vanadium is precipitated from the alkaline extract by adding $H_2SO_4$ up to $pH \approx 2$ and an ammonium salt. The precipitated ammonium polyvanadate is calcinated to vanadium pentoxide.

5 Claims, No Drawings

PROCESS FOR THE HIGH-YIELD RECOVERY OF VANADIUM FROM PETROLEUM COMBUSTION RESIDUES

BACKGROUND OF THE INVENTION

The present invention relates to an improved process for the recovery of vanadium from various residues from the combustion of petroleum.

Processes according to the prior art for the recovery of vanadium from the various residues deriving from petroleum combustion are substantially of two types: those which make vanadium extraction from said residues in acid solutions, and those which instead make said extraction in a basic medium.

For the processes of the second type, a very modest basic leaching yield has been hitherto obtained with petroleum ash: for example, with a 5-10% solution of caustic soda the yield obtained was smaller or at the most equal to 60% with respect to the vanadium originally contained in the treated residues.

SUMMARY OF THE INVENTION

The aim of the present invention is to provide a process for recovering vanadium from petroleum combustion residues which allows to obtain high vanadium recovery yields.

A further object of the present invention is to provide a vanadium recovery process which is economically feasible even in the presence of low vanadium percentages, in the range of 2-3% by weight with respect to the weight of the starting residues, and conversely in the presence of high percentages of further interfering polyvalent cations, such as iron and calcium, that is to say, of percentages which have hitherto been considered uneconomical for recovery.

This aim, this object and others which will become apparent hereinafter are achieved, according to the invention, by a process for the recovery of vanadium from the residues of petroleum fraction combustion, comprising extracting vanadium from said residues by treatment with an alkaline solution and recovery of vanadium from said alkaline solution, characterized in that said treatment is performed: (a) in the presence of an oxidizing agent for vanadium, ior alternately (b) by wetting the residues with the alkaline solution, drying and roasting at 100°-250° C. and leaching with water; thereby obtaining an alkaline solution which contains the selectively extracted vanadium with a yield of over 80% with respect to the vanadium contained in said residues.

Without being bound to any theoretical interpretation as to the exact mechanism at the base of the present invention, it is believed that the high yields obtainable with the present process are due to the conversion of the vanadium in the petroleum combustion residues from an oxidation state (IV) to vanadium (V), that is, from a form which is insoluble in alkali, to a form soluble therein.

The process according to the present invention is applicable to various types of residues, such as ash, soot, crusts, aqueous or sulphuric lixiviates of ash and soot, water correction muds, etc. The vanadium content of such residues can be as low as 2-3% and contents of further interfering cations such as iron, calcium, magnesium etc., which usually negatively affect the vanadium recovery process, can be up to 15% or more, practically without limit.

According to the embodiment (a) of the invention, the starting residues are leached with a sodium hydroxide solution having a concentration of 5-15% by weight in the presence of an oxidizing agent. As an oxidizer it is possible to use hydrogen peroxide or preferably aqueous sodium hypochlorite.

Advantageously, an amount of oxidizing agent ranging from a stoichiometric value up to 100% in excess with respect to the vanadium (IV) and iron (II) contents of the residues, and a quantity of 3-5 liters of sodium hydroxide/kg of solids (starting residues), are used.

The alkaline leaching and oxidizing steps can be performed together in a same reactor kept under stirring and heated to approximately 60°-80° C. for a period ranging from 30 minutes to a few hours.

According to the other embodiment (b) of the invention, the starting residues are mixed with a saturated solution of sodium hydroxide, in an amount 3 to 5 times (mole/mole) that of the vanadium, then they are dried and roasted in dry air at 100°-250° C. and finally leached with water in the ratio of at least 5 liters per kg of residue.

The extract, or alkaline lixiviate or leaching solution, obtained according to one or the other of the embodiments of the invention contains 80-95% of the vanadium contained in the starting solids, regardless of the state of oxidation or original combination of the vanadium, while further polyvalent cations such as iron, nickel, calcium, magnesium etc. remain in the insolute, wherefrom the recovery of nickel by known methods may be economically appealing.

After being filtered and washed, to the lixiviate, brought to an acid pH of approximately 2 with sulphurc acid, is added an ammonium salt to precipitate the vanadium as ammonium polyvanadate. For this purpose, ammonium sulphate can be used in the amount of 60-80 g of ammonium sulphate per liter of acidified lixiviate, heating to 70°-100° C.

The ammonium polyvanadate is then subject to a mild calcination at 180°-200° C. to obtain vanadium pentoxide, which is a commercially valuable product, and ammonia. The latter can be collected in sulphuric acid to be recycled to the above said ammonium polyvanadate precipitation step.

From the above description, it can be observed that the process according to the present invention achieves the proposed aim and objects. In fact it leads to a high yield for the selective recovery of vanadium in the range of 80-95% even in the presence of high percentages of interfering polyvalent cations, thus providing a process which does not require additional stages and devices for the separation of said interfering cations before the precipitation of the vanadium.

Moreover, the above advantages can be achieved economically even for petroleum combustion residues with low vanadium contents.

The following examples are intended to illustrate some possible embodiments of the process according to the present invention, without thereby limiting in any way the scope defined herein.

EXAMPLE No. 1

The selective leaching of vanadium in an alkaline medium according to the embodiment (a) of the invention was applied to a sample of residues from the correction of the water deriving from the washing of ash taken from the ENEL power plant of San Filippo del Mela (Messina, Italy).

These residues, after vacuum filtering and drying at 110° C., had the following composition, expressed in percentages by weight g/g:

| Vanadium | Iron | Nickel | Calcium | Magnesium |
|----------|------|--------|---------|-----------|
| 17.6%    | 13.7%| 2.5%   | 2.5%    | 5.3%      |

This sample was leached with an aqueous solution of 15% sodium hydroxide and 10% sodium hypochlorite, in the ratio of 5 liters per kg of mud. After 30-60 minutes of contact at the temperature of 60°-80° C. and under stirring, the lixiviate was separated from the insolute. It contained a vanadium concentration of 29.6 g/liter, corresponding to an 85.3% leaching yield with respect to the vanadium initially present in the mud. Iron, calcium, magnesium and nickel remained entirely in the insolute.

The lixiviate was subject to vanadium precipitation by means of acidification up to pH 2-3 with sulphuric acid, addition of 60-80 g per liter of ammonium sulphate, heating to 90°-100° C. for 20-40 minutes, filtering, washing with N/100 sulphuric acid of the precipitate and decomposition thereof at 200° C. A product weighing 262.5 g and consisting of 99.2% vanadium pentoxide was obtained for each kg of mud at the end of the treatment.

The ammonia developed during the decomposition was collected in sulphuric acid to obtain ammonium sulphate which contributed to a partial recovery of the same salt used as reagent.

EXAMPLE NO. 2

The selective leaching of the vanadium in an alkaline medium, according to the other embodiment (b) of the invention, was applied to a sample of "boiler crusts" taken from the ENEL power plant of San Filippo del Mela (Messina, Italy).

This sample had the following composition, expressed as percentages by weight g/g:

| Vanadium | Iron | Nickel | Calcium | Magnesium |
|----------|------|--------|---------|-----------|
| 22.76%   | 2.24%| 5.69%  | 2.13%   | 20.57%    |

One kilogram of these crusts was moistened with one liter of saturated aqueous solution of caustic soda and then dried at 250° C.

This residue was leached with 15 liters of water kept in contact therewith for one hour at 90° C.

The filtrate, separated from the insolute, when analyzed contained practically only vanadium in the concentration of 12.20 g/l, equal to 80.4% of the vanadium initially present in the crusts. The vanadium was precipitated as ammonium polyvanadate from said lixiviate in the manner described in example 1. This precipitate was then filtered and decomposed at 200° C. into vanadium pentoxide, which upon analysis weighed 318.3 g and had a 99.2% purity, equal to a precipitation yield of 97.5%.

EXAMPLE NO. 3

A sample of soot taken from the electric filters of the ENEL power plant of Termini Imerese was leached according to said embodiment (a) of the invention with an aqueous solution of 3% sodium hypochlorite and 5% sodium hydroxide in the ratio of 3 liters per kg. At the moment of taking the sample, the power plant was not using Venezuelan oil or magnesium oxide as an additive. The sample had the following composition, expressed in percentages (g/g, on the dry part at 110° C.):

| Vanadium | Iron  | Nickel | Magnesium |
|----------|-------|--------|-----------|
| 3.03%    | 4.81% | 1.12%  | 0.43%     |

After maintaining contact between the solid and the leaching solution for 40 minutes at 60°-80° C. under stirring, the residue was washed and filtered. 90% of the vanadium initially contained in the soot was found to have passed into the alkaline lixiviate at a concentration of 9.09 g/l. The vanadium was then precipitated as described in example 1 with a yield of 99.0% and decomposed to pentoxide with a purity of 99.5%.

EXAMPLE NO. 4

One kilogram of a sample of "soot" from the ENEL power plant of Termini Imerese (Palermo, Italy) was treated according to said embodiment (b) of the invention and was therefore moistened with 300 ml of saturated aqueous solution of caustic soda.

The composition, expressed in percentages, of said sample, given by weight g/g and with reference to the dry part at 100° C., is as follows:

| Vanadium | Iron  | Nickel | Magnesium |
|----------|-------|--------|-----------|
| 4.9%     | 12.7% | 2.1%   | 0.4%      |

Said sample, after drying at 150° C., was leached with 5 liters of water, maintaining contact at 85° C. for one hour. Analysis showed the filtrate, separated from the insolutes, to have a content of 8.34 g/l of vanadium, equal to 85.0% of the vanadium initially present in the soot. Iron, nickel and magnesium remained in the undissolved residue.

The vanadium was then precipitated in the manner described in example 1, with a precipitation yield of 98%.

72.5 g of 99.5% vanadium pentoxide were obtained from the subsequent decomposition of the ammonium vanadate precipitated and filtered from the mother liquor.

We claim:

1. A process for recovering vanadium from solid residues of combustion of petroleum fractions consisting of treating said residues with a saturated aqueous solution of sodium hydroxide in a ratio of 3-5 moles of NaOH per mole of vanadium whereby said residues become wetted, drying and roasting the so treated residues at 100°-250° C., leaching to residues with water thereby obtaining an alkaline solution containing vanadium selectively extracted from said residues with a yield of at least 80% with respect to the total vnadium contained in said residues and recovering vanadium from said solution.

2. Process according to claim 1, wherein the vanadium extracted in said alkaline solution is recovered by bringing said solution to a pH ranging from 1.7 to 2.3 by the addition of sulphuric acid and by adding an ammonium salt in an amount of 60-80 g/liter and subjecting the solution to digestion at 70°-100° for 20-40 minutes.

3. Process according to claim 2, furthermore comprising calcinating the precipitated ammonium polyvanadate at 180°-200° C. to obtain vanadium pentoxide and ammonia to be recycled to said precipitation stage.

4. A process for recovering vanadium from solid residues of combustion of petroleum fractions consisting of treating said residues with a saturated aqueous solution of sodium hydroxide in a ratio of 3-5 moles of NaOH per mole of vanadium whereby said residues become wetted, drying and roasting the so treated residues at 100°-250° C., leaching with water whereby obtaining an alkaline solution containing vanadium selectively extracted from said residues with a yield of at least 80% with respect to the total vanadium contained in said residues, adjusting the pH of said alkaline solution in a range of 1.7 to 2.3 by addition thereto of sulphuric acid and of an ammonium salt in an amount of 60-80 g/liter and subjecting to digestion at 70°-100° C. for 20-40 minutes whereby precipitating ammonium polyvanadate.

5. A process for recovering vanadium from solid residues of combustion of petroleum fractions having a vanadium content of 2-3% by weight consisting of treating said residues with a saturated aqueous solution of sodium hydroxide in a ratio of 3-5 moles of NaOH per mole of vanadium whereby said residues become wetted, drying and roasting the so treated residues at 100°-250° C., leaching to residues with water whereby obtaining an alkaline solution containing vnadium selectively extracted from said residues with a yield of at least 80% with respect to the total vanadium contained in said residues and recovering vanadium from said solution.

* * * * *